(12) United States Patent
Mollema et al.

(10) Patent No.: US 7,170,200 B2
(45) Date of Patent: Jan. 30, 2007

(54) STARTER ASSEMBLY FOR A GAS DISCHARGE LAMP

(75) Inventors: Scott A. Mollema, Grand Rapids, MI (US); David W. Baarman, Fennville, MI (US); Roy W. Kuennen, Caledonia, MI (US)

(73) Assignee: Access Business Group International LLC, Ada, MI (US)

( * ) Notice: Subject to any disclaimer, the term of this patent is extended or adjusted under 35 U.S.C. 154(b) by 0 days.

(21) Appl. No.: 10/849,731

(22) Filed: May 20, 2004

(65) Prior Publication Data

US 2004/0222751 A1 Nov. 11, 2004

Related U.S. Application Data

(63) Continuation of application No. 10/368,702, filed on Feb. 18, 2003, now Pat. No. 6,806,649.

(60) Provisional application No. 60/357,908, filed on Feb. 19, 2002.

(51) Int. Cl.
   *H01H 19/64* (2006.01)

(52) U.S. Cl. .................. 307/113; 307/143; 307/141; 307/10.6

(58) Field of Classification Search ........... 315/209 M, 315/209 SC, 209 CD, 209 T; 307/139–141, 307/141.8, 143
   See application file for complete search history.

(56) References Cited

U.S. PATENT DOCUMENTS

| | | | |
|---|---|---|---|
| 2,916,671 A * | 12/1959 | Retzer | 315/239 |
| 4,328,446 A * | 5/1982 | Fallier et al. | 315/47 |
| 4,349,768 A | 9/1982 | Miller | |
| 4,355,261 A | 10/1982 | Cohen et al. | |
| 4,501,994 A | 2/1985 | Spreadbury | |
| 4,520,294 A * | 5/1985 | Iida et al. | 315/50 |
| 4,523,795 A | 6/1985 | Johnson et al. | |
| 4,661,745 A * | 4/1987 | Citino et al. | 315/106 |
| 4,791,338 A | 12/1988 | Dean et al. | |
| 4,914,354 A * | 4/1990 | Hammer et al. | 315/247 |
| 5,023,521 A | 6/1991 | Sridharan | |
| 5,027,032 A | 6/1991 | Nilssen | |
| 5,070,279 A | 12/1991 | Garbowicz et al. | |

(Continued)

FOREIGN PATENT DOCUMENTS

EP  0 168 947 A1  1/1986

(Continued)

*Primary Examiner*—Tuyet Thi Vo
(74) *Attorney, Agent, or Firm*—Marc T. Filigenzi

(57) ABSTRACT

The present invention comprises a unique starter assembly for a gas discharge lamp. The starter assembly comprises a main current path with a first leg connected to one electrode of a gas discharge lamp, and a second leg connected to a second electrode of the gas discharge lamp. A starting current path is provided between the first and second electrode, and comprises an magnetic switch. The magnetic switch is actuated by an electromagnet controlled by a control circuit. The control unit may be programmed with the start time required for a particular lamp design. In an alternative embodiment, the starter assembly further comprises a radio frequency identification system. The radio frequency identification system includes a gas discharge lamp transponder. The lamp transponder is used to communicate specific lamp information to the control circuit. The control circuit may then modify the start time for that lamp based on this information.

12 Claims, 4 Drawing Sheets

U.S. PATENT DOCUMENTS

| | | | |
|---|---|---|---|
| 5,164,636 A * | 11/1992 | Allaire | 315/200 A |
| 5,256,939 A | 10/1993 | Nilssen | |
| 5,652,481 A | 7/1997 | Johnson et al. | |
| 5,656,891 A | 8/1997 | Luger et al. | |
| 5,768,898 A * | 6/1998 | Seok et al. | 62/132 |
| 5,811,940 A | 9/1998 | Nutzel | |
| 5,925,990 A | 7/1999 | Crouse et al. | |
| 5,945,786 A | 8/1999 | Jurek | |
| 6,040,661 A | 3/2000 | Bogdan | |
| 6,359,387 B1 | 3/2002 | Giannopoulos et al. | |
| 6,507,154 B1 * | 1/2003 | Menke | 315/83 |
| 6,661,177 B2 * | 12/2003 | Luijks et al. | 315/60 |

FOREIGN PATENT DOCUMENTS

| | | |
|---|---|---|
| WO | WO 01/43510 A1 | 6/2001 |

* cited by examiner

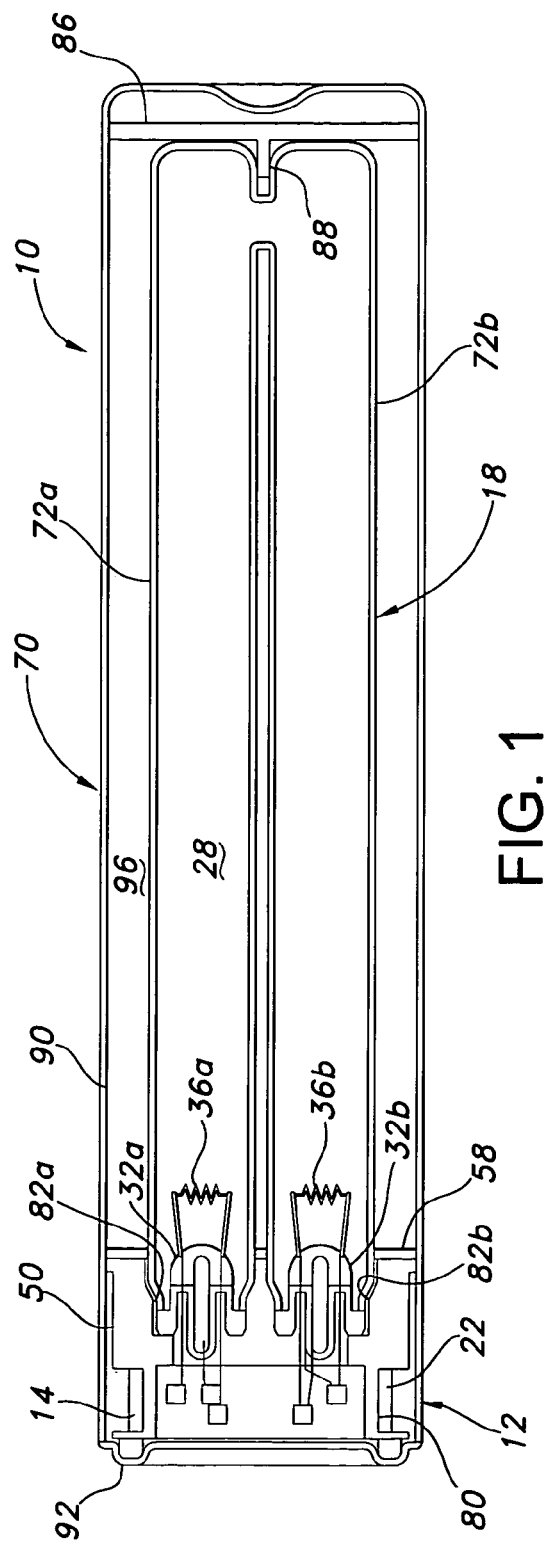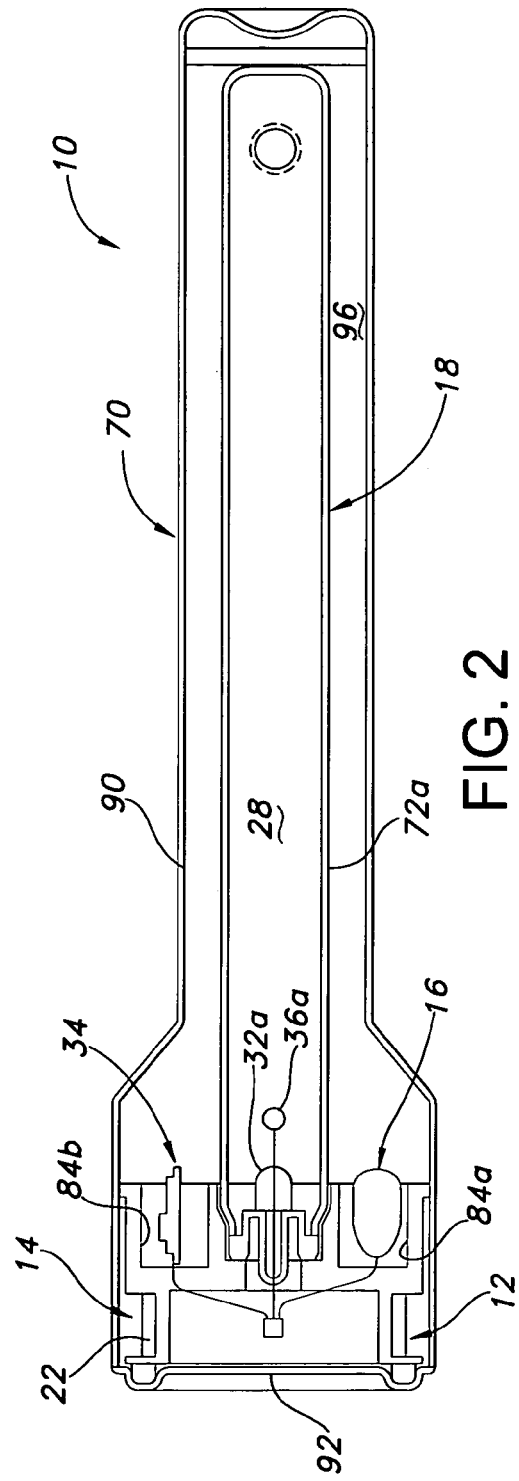

STARTER ASSEMBLY FOR A GAS DISCHARGE LAMP

The present invention is a continuation of U.S. application Ser. No. 10/368,702, which was filed on Feb. 18, 2003, now U.S. Pat. No. 6,806,649 which claims benefit under 35 USC §119(e) of U.S. provisional patent application Serial No. 60/357,908, entitled "Point Of Use Water Treatment System" filed on Feb. 19, 2002.

This application hereby incorporates by reference U.S. patent application Ser. No. 10/133,860, entitled "Inductively Powered Lamp Assembly," filed on Apr. 26, 2002, now U.S. Pat. No. 6,731,071; U.S. patent application Ser. No. 09/592,194 entitled "Fluid Treatment System", filed on Jun. 12, 2000, now U.S. Pat. No. 6,436,299; U.S. patent application Ser. No. 10/246,155 entitled "Inductively Coupled Ballast Circuit", filed on Sep. 18, 2002; and issued U.S. Pat. No. 6,436,299, entitled "Water Treatment System with an Inductively Coupled Ballast".

BACKGROUND OF THE INVENTION

The present invention relates to starters for gas discharge lamps, and in particular to a starter assembly having a magnetic switch for starting a lamp. Traditionally, gas discharge lamps used a special starter switch mechanism to start the lamp. When the lamp is first turned on, electricity flows through a bypass circuit and across a starter switch and through the lamp electrodes. This electricity preheats the electrodes, ionizing the gas in the lamp, thereby creating an electrically conductive medium. After the electrodes are heated sufficiently, the starter switch opens, causing the lamp ballast to provide a voltage surge, and the electric current to arc through the gas discharge lamp. The conventional starter switch uses a small discharge bulb containing neon or some other gas. The bulb has two electrodes positioned adjacent to each other. Current arcs between the electrodes, causing a small amount of heat to build within the bulb, which causes one bimetallic electrodes to bend so that it makes contact with the other electrode. When the two electrodes make contact, the current no longer arcs between the electrodes. Consequently, there are no charged particles flowing through the gas. Without the heat from the charged particles, the bimetallic electrode cools, bending away from the other electrode. This opens the circuit, causing the ballast to transfer energy to the lamp electrodes, and subsequently causing the lamp to ignite. When the current flows through the bypass circuit, it establishes a magnetic field in part of the lamp ballast. This magnetic field is maintained by the flowing current. When the starter switch is opened, the current is briefly cut off from the ballast. The magnetic field collapses, which creates a sudden jump in current causing the ballast releases its stored energy and light the gas discharge lamp.

Other gas discharge lamps rely on a design that does not include a starter switch. Instead, the lamp's ballast constantly channels current through both electrodes. This current flow is configured so that there is a charge difference between the two electrodes, establishing a voltage across the lamp.

Alternatively, gas discharge lamps may rely on a high initial voltage to the lamp electrodes, producing a corona discharge used to start the lamp. Excess electrons on the lamp electrode surface forces some electrons into the gas. These free electrons ionize the gas, and almost instantly the voltage difference between the electrodes establishes an electrical arc.

A first problem with the above starter designs is that they are unable to accommodate variations in lamp preheat requirements. A particular starter must be designed for the preheat requirements of a particular gas discharge lamp or narrow range of gas discharge lamps. A second problem with the above starter designs is that they are unable to adapt to variations in gas discharge lamps caused by variations in lamp materials and lamp construction. These variations can cause a change in the preheat requirements for the lamp. This change may result in a change in the lamp starter design, or a discarding of off-specification lamps. Another problem with the above starter designs is that they are unable to accommodate changes in gas discharge lamp preheat requirements, particularly as these gas discharge lamps change with use and age. The starter assembly of the present invention overcomes, or minimizes these, and other problems associated with conventional gas discharge lamp starters.

SUMMARY OF THE INVENTION

The present invention comprises a unique starter assembly for a gas discharge lamp. The starter assembly includes a current path with a first leg connected to a first electrode of a gas discharge lamp, and a second leg connected to a second electrode of the gas discharge lamp. The current path comprises an magnetic switch. The magnetic switch is actuated by an electromagnet controlled by a control circuit. The control unit may be programmed with the preheat time required for the gas discharge lamp. In an alternative embodiment, the control unit may be programmed with a range of preheat times for a gas discharge lamp. According to this embodiment, the control unit may be provided with preheat times that increase in duration with each start of the lamp or in the alternative, increase in duration as the lamp ages.

In another alternative embodiment, the starter assembly is further comprised of a control unit and a radio frequency identification system. The radio frequency identification system includes a transponder coupled with the gas discharge lamp. The radio frequency identification system obtains information about the lamp from the lamp transponder. This information is then provided to the control circuit. The control circuit may modify the preheat time for that lamp based on this information. Those skilled in the art would recognize that alternative non-contact, as well as contact-type identification systems may be used instead of the radio frequency identification system.

BRIEF DESCRIPTION OF THE DRAWINGS

FIG. 1 is a sectional view of a lamp assembly according to one embodiment of the present invention;

FIG. 2 is a sectional view the lamp assembly of FIG. 1 taken perpendicularly to the sectional view of FIG. 1;

DETAILED DESCRIPTION OF INVENTION

Figure 3:
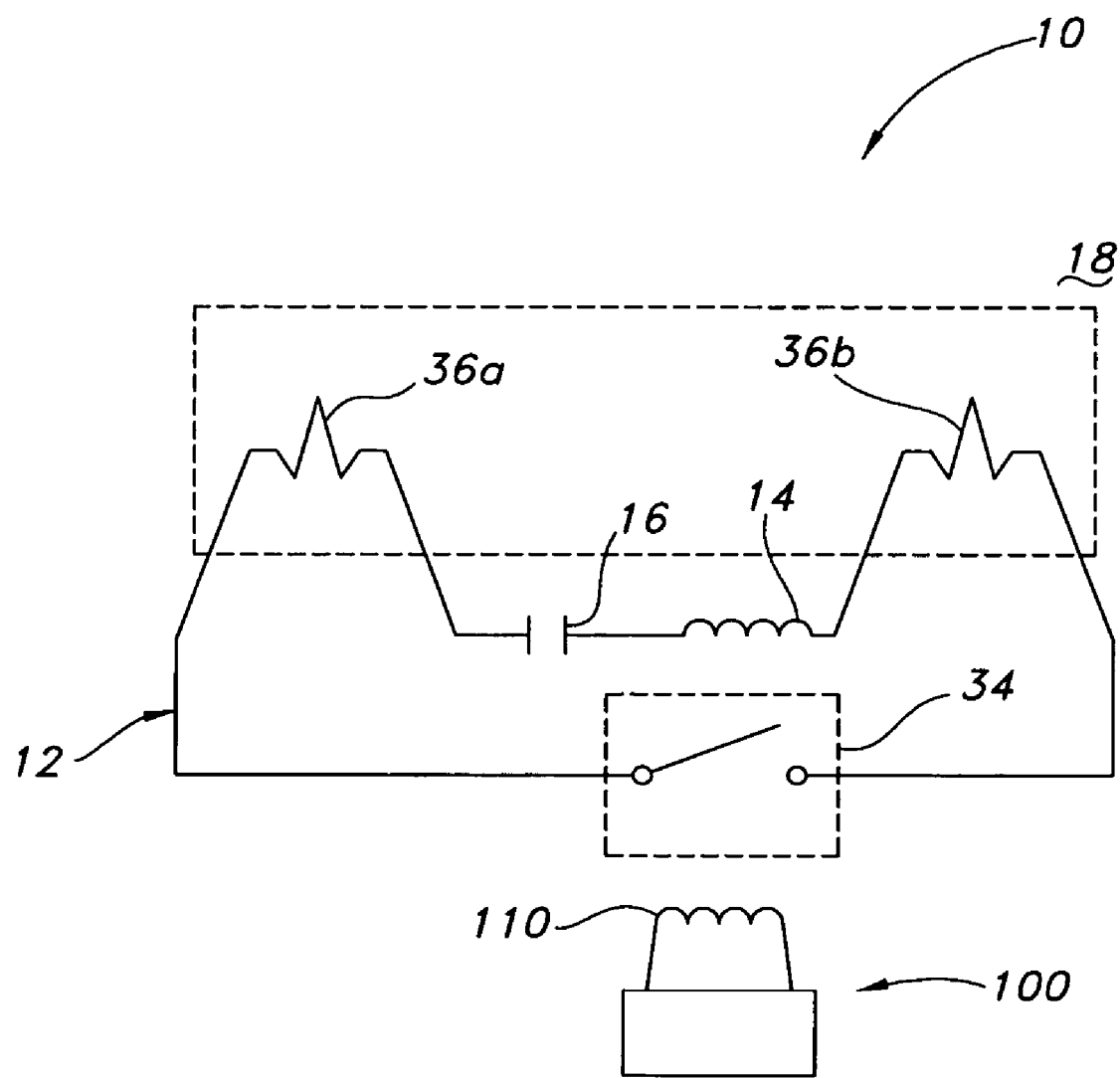
FIG. 3 is a schematic diagram of the lamp circuit of the illustrated embodiment.

The present invention is not limited in its application to the details of construction and arrangement of parts as illustrated in the accompanying drawings and specifications. Although described in connection with this particular application, one skilled in the arts would recognize that the present invention is capable of being practiced in various ways within the scope of the claims. In addition, although the magnetic starter circuit of the present invention is illustrated as used with a ultra violet lamp, one skilled in the art would recognize that the present invention is capable of being used in connection with any type of gas discharge lamp that utilizes a starter circuit.

I. Lamp Configuration

A gas discharge lamp assembly according to one embodiment of the present invention is shown in FIGS. 1 and 2, and is generally designated 10. For purposes of disclosure, the present invention is described in connection with a conventional type PL-S 11 watt ultra violet (UV) lamp converted for use at 38 watt, such as the type described in U.S. patent application Ser. No. 10/133,860 filed on Apr. 26, 2002, entitled "Inductively Powered Lamp Assembly", the subject matter of which is hereby incorporated in its entirety by reference. The lamp assembly 10 generally includes a lamp circuit 12 and an outer sleeve 70. In this embodiment, the lamp circuit 12 includes a single secondary 14, preferably in the form of a coil of small diameter wire 22. The secondary 14 inductively receives power from the primary (not shown) of an associated ballast (not shown). The entire lamp circuit 12 and lamp 18 is fully enclosed within the outer sleeve 70. In the illustrated embodiment, at least a portion of the outer sleeve 70 is transparent and is not penetrated by electrical wires or other elements. Outer sleeve 70 preferably includes a main body 90 and a cap 92. The main body 90 is a generally cylindrical tube having an open end and a closed end. After the lamp circuit 12 is installed within the main body 90, the cap 92 is sealed over the open end of the main body 90 to fully enclose the lamp circuit 12. The lamp 18 is a generally conventional PL-S type lamp having a quartz sleeve with two parallel legs 72a–b that are interconnected to cooperatively define a chamber 28. The chamber 28 is partially evacuated and contains the desired electric-discharge gas, such as mercury vapor. A stem 32a–b is located at the base of each leg 72a–b. A pair of conventional or custom designed electrodes 36a–b are disposed within the chamber 28, one mounted atop each of the stems 32a–b. In this embodiment, the outer sleeve 70 is preferably manufactured from quartz to permit the efficient passage of UV light. In non-UV applications, the outer sleeve may be manufactured from glass, Teflon or plastic, depending in part on the heat generated by the lamp and the operating environment of the lamp. For example, an alternative outer sleeve can be manufactured from a length of Teflon tubing having sealed opposite ends (not shown). The Teflon tubing can be fitted over the remainder of the lamp assembly, and its opposite ends can be crimped or otherwise sealed to close the Teflon sleeve. Preferably, each end of the Teflon tubing is folded back onto itself and crimped using heat and pressure.

With further reference to the figures, and in particular FIGS. 1 and 2, lamp assembly 10 also includes a base 50 and a support 86 that hold opposite ends the lamp 18 within the outer sleeve 70. The base 50 is generally cylindrical and dimensioned to be fitted closely within the outer sleeve 70. In addition to holding one end of the lamp 18, the base 50 also receives capacitor 16 and magnetic switch 34 as described in more detail below. The base 50 defines an annular recess 80 to receive the windings of the secondary 14, and a pair of apertures 82a–b to receive the base end of each leg 72a–b and a pair of voids 84a–b to contain the capacitor 16 and magnetic switch 34 or transponder 126 as described in more detail below. The lamp assembly 10 may also include a heat reflector 58 disposed between the secondary and the electrodes 36a–b. The heat reflector 58 is preferably shaped to match the cross-sectional shape of the lamp sleeve 52 at the point where it is mounted, and is preferably manufactured from a conventional reflective material, such as aluminum or aluminum foil on a suitable substrate. The support 86 is generally disc-shaped and is dimensioned to be fitted closely within the outer sleeve 70. The support 86 preferably includes a tab 88 to be frictionally fitted between the legs 72a–b of the quartz sleeve 52. The precise design and configuration of the base 50 and support 86 can vary among applications depending on the design and configuration of the outer sleeve 70 and the various components of the lamp circuit 12. The base 50 and support 86 are preferably manufactured from materials capable of withstanding high heat, such as ceramic or high temperature plastics.

A wide variety of ballasts capable of powering the inductive lamp assembly 10 are well known to those skilled in the field. Accordingly, the ballast will not be described in detail. One ballast particularly well-suited for use with the lamp of the illustrated embodiment is disclosed in U.S. patent application Ser. No. 10/246,155 entitled "Inductively Coupled Ballast Circuit", filed on Sep. 18$^{th}$, 2002, which is incorporated in its entirety herein by reference. This ballast can be readily adapted to provide efficient operation of the disclosed embodiments of the present invention.

II. Starting Circuit

Figure 4:
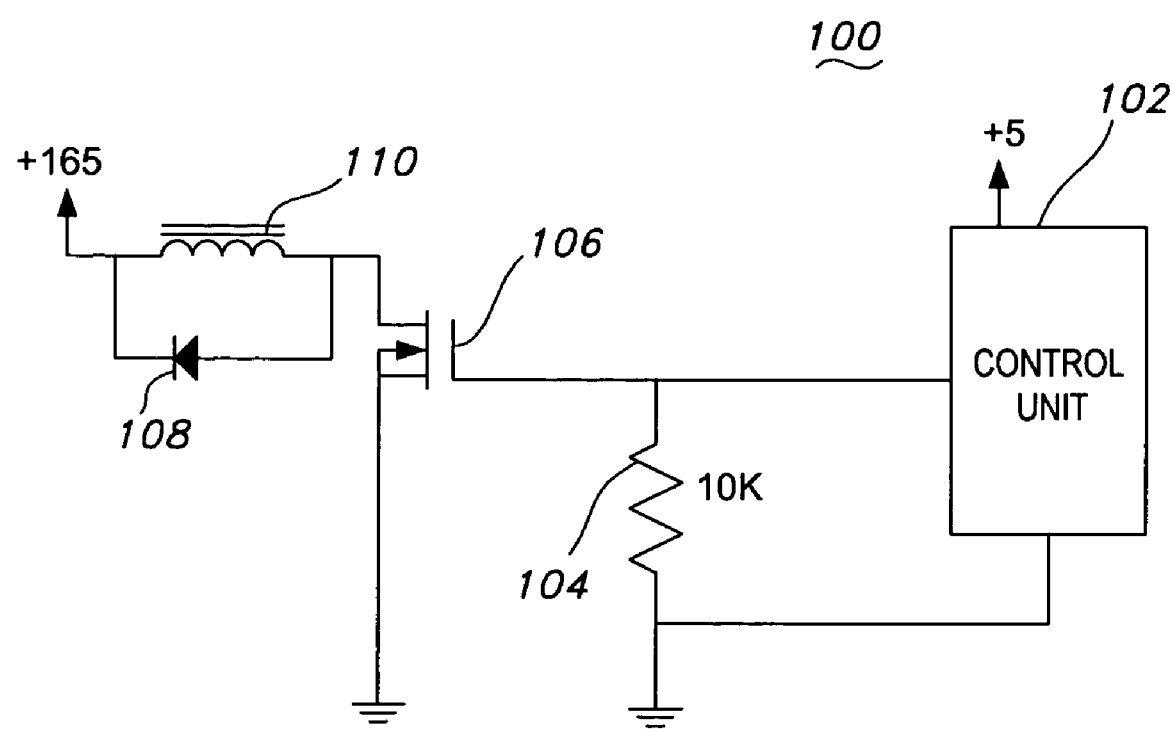
FIG. 4 is a schematic of the starter circuit of the illustrated embodiment.

Referring to the figures, and in particular to FIGS. 3 and 4, the starter assembly of the illustrated embodiment is shown in conjunction with the UV lamp assembly 10 described above. Lamp circuit 12 is comprised of electrodes 36a–b, capacitor 16, secondary coil 14, and magnetic switch 34. One typical lamp circuit suited for use with the magnetic starter assembly of the present invention is described in U.S. patent application Ser. No. 10/133,860 entitled "Inductively Powered Lamp Assembly," filed on Apr. 26, 2002 and incorporated in its entirety herein by reference.

With further reference to FIGS. 3 and 4, magnetic switch 34 is wired in series between the electrodes 36a–b and is actuated by electronics module 100. Electronics module 100 is comprised of control unit 102, resistor 104, FET 106, diode 108, and electromagnet 110. Electromagnet 110 is positioned proximate to magnetic switch 34 where, when charged, it can selectively close switch 34. Control unit 102 controls operation of electromagnet 110. Control unit 102 is programmed, using methods known in the arts, to charge electromagnet 110 for a fixed interval of time, or "preheat time" each time that lamp circuit 12 is powered on. According to the illustrated embodiment, lamp ballast (not shown) provides power from a primary coil (not shown) to secondary coil 14. Lamp ballast (not shown) also provides a lamp start signal to control unit 102. Control unit 102 then utilizes a 5 volt signal to close FET 106, creating a 165 volt charge across electromagnet 110. This charge causes electromagnet 110 to generate a magnetic field which closes the magnetic switch 34, thereby causing current from secondary coil 14 to flow directly through the electrodes 36a–b, rather than through legs 72a–b. As a result, electrodes 36a–b are rapidly heated. After the fixed interval of preheat time, control unit 102 opens FET 106, causing de-energizing of electromagnet 110. De-energizing of electromagnet 110 causes the opening of switch 34, which, in turn, causes current to flow through legs 72a–b between electrodes 36a–b. Opening of switch 34 often provides a voltage surge from the lamp ballast (not shown) used to start gas discharge lamp 18. Magnetic switch 34 is preferably arranged substantially perpendicular to the field of the ballast primary coil (not shown) so that the magnetic switch 34 is not actuated by the magnetic field of the primary coil (not shown). Magnetic switch 34 of the illustrated embodiment is a normally open magnetic reed switch manufactured by Coto, part number RI-48A, although one skilled in the art would recognize that any substantially similar magnetic switch would function equivalently. The preheat time interval for lamp assembly 10 of the illustrated embodiment is 400 milliseconds, although one skilled in the arts would recognize that this preheat time may vary between different lamp configurations, and between lamps of the same configuration. Electromagnet 110 of the illustrated embodiment is comprised of an Elytone coil, part number YT-50054-1. Although shown with an FET, one skilled in the arts would recognize that any relay device could be used to apply power to electromagnet 110. Control unit 102 of the illustrated embodiment is comprised of a Microchip Technology Inc. microprocessor, part number 18F452.

III. Alternative Embodiments

Figure 5:
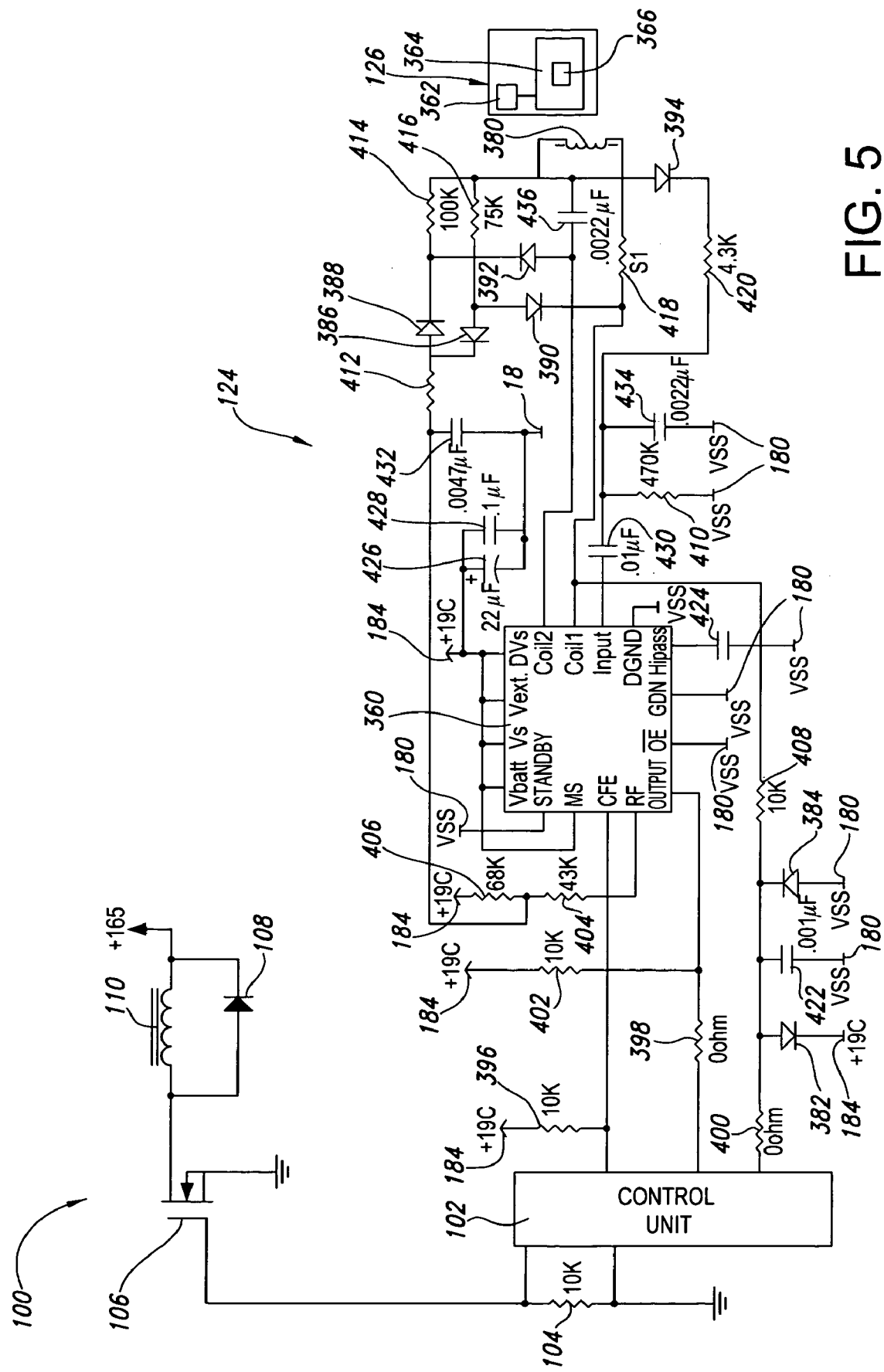
FIG. 5 is a schematic of the starter circuit and radio frequency identification system of the illustrated embodiment.

An alternative embodiment of the magnetic starter assembly of the present invention further comprises a Radio Frequency Identification (RFID) system. Referring to FIG. 5, lamp assembly 10 of the illustrated embodiment is further comprised of transponder 126, and electronics module 100 is further comprised of RFID circuit 124. RFID circuits are known in the arts, with an exemplary RFID circuit described in U.S. Pat. 6,436,299 entitled "Water Treatment System with an Inductively Coupled Ballast", the contents of which is hereby incorporated in its entirety by reference. The RFID circuit allows contactless reading of data, which is transmitted from transponder 126 to control unit 102, or, in an alternative embodiment, bidirectionally between the transponder 126 and control unit 102.

The radio frequency identification system 124 is used by the control unit 102 to obtain information specific to UV lamp assembly 10. Since the UV lamp radio frequency identification transponder 126 is located in the UV lamp assembly 10, these devices are never separated, which allows the control unit 102 to read or write information to and from transponder 126 through the base station 360.

Referring again to FIG. 5, the UV lamp radio frequency identification transponder 126 includes a transponder antenna 362 and a read/write IDIC® (e5551) chip 364. The read/write IDIC® (e5551) chip further includes an EEPROM device 366 that physically stores the relevant information for each respective UV lamp assembly 10 in memory locations. In the presently preferred embodiment, the information consists of an ultraviolet lamp serial number and ultraviolet lamp preheat time.

The ultraviolet lamp serial number is unique to each ultraviolet lamp assembly 10. The ultraviolet lamp preheat time relates to the amount of time the ultraviolet lamp 18 needs to be preheated.

The radio frequency identification system 124 includes the base station 360, a coil 380, a plurality of diodes 382, 384, 386, 388, 390, 392, 394, a plurality of resistors 396, 398, 400, 402, 404, 406, 408, 410, 412, 414, 416, 418, 420 and a plurality of capacitors 422, 424, 426, 428, 430, 432, 434, 436 that are electrically connected as illustrated in FIG. 5. Those skilled in the art would recognize that the connection of the aforementioned components is well known to those skilled in the art. The radio frequency identification system 124 has been installed in electronics module 100 using specifications set forth for the TK5551A-PP, which, as previously set forth, is manufactured by TEMIC Semiconductors. For the purpose of the present invention, it is important to note that the base station 360 uses the coil 380 for bidirectional communication with the ultraviolet light radio frequency identification transponder 126. The control unit 102 is electrically connected with the base station 360 so that the control unit 102 can communicate with the base station 360. Radio frequency identification system 124 is connected with the first DC power source 180 and the second DC power source 184 as illustrated in FIG. 5, which provides the radio frequency identification system 124 with energy to function during operation.

In one alternative of the illustrated embodiment, stored in EEPROM device 366 is programmed with lamp assembly 10 serial number using methods well known in the arts. Upon start-up of lamp assembly 10, radio frequency identification system 124 retrieves the serial number for lamp assembly 10 from transponder 126. Lamp assembly 10 serial number is communicated to control unit 102 by base station 360. Using methods known in the art, control unit 102 then refers to a pre-programmed look-up table to determine the preheat time for that particular lamp assembly based on the retrieved serial number from transponder 126. Control unit 102 activates electromagnet 110 for the preheat time specified, thereby preheating elements 36a–b prior to starting lamp assembly 10.

In a second alternative of the illustrated embodiment, stored in EEPROM device 366 is programmed with lamp assembly 10 serial number using methods well known in the arts. EEPROM device 366 is further configured to store the number of starts for each lamp assembly 10 started by the starter assembly of the present invention. Upon start-up of lamp assembly 10, radio frequency identification system 124 retrieves the serial number for lamp assembly 10 from transponder 126. Lamp assembly 10 serial number is communicated to control unit 102 by base station 360. Control unit 102 then refers to a pre-programmed look-up table stored in EEPROM device 366 to determine the preheat time for that lamp assembly 10 based on the lamp assembly 10 serial number and total number of lamp assembly 10 starts. After lamp assembly 10 has been started, control unit increments the total number of lamp assembly 10 starts stored in stored in EEPROM device 366. In one embodiment of the present invention, the preheat time for lamp assembly 10 is increased as the number of starts increases.

In another alternative embodiment, stored in EEPROM device 366 is programmed with the preheat for lamp assembly 19 using methods known in the arts. Upon start-up of lamp assembly 10, radio frequency identification system 124 retrieves the preheat for lamp assembly 10 from stored in EEPROM device 366. Lamp assembly 10 preheat is communicated to control unit 102 by base station 360. Control unit 102 then uses this preheat time to energize electromagnet 110 each time lamp circuit 12 is powered on.

Those skilled in the art would recognize that other identification systems could be used with the present invention, such as contact-type identification systems. However, the present preferred embodiment of the invention uses a radio frequency identification system 124 because of the inherent benefits such a system provides.

The configuration of the magnetic starter assembly may vary materially from application to application depending largely on the type of lamp and the associated power requirements. The present invention can be readily modified to permit use with a wide variety of existing lighting systems. The above description is that of various embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a", "an", "the", or "said", is not to be construed as limiting the element to the singular.

What is claimed:

1. A starter assembly for a gas discharge lamp, the starter assembly comprising:
   at least one switch located in the gas discharge lamp;
   a control unit operable for actuating the switch;
   wherein the control unit is programmable to receive a first preheat time for the gas discharge lamp; and
   wherein the control unit actuates the switch for a predetermined length of time.

2. The starter assembly of claim 1, wherein the switch is a normally open magnetic switch.

3. The starter assembly of claim 1, wherein the control unit is comprised of an electromagnet operable to close the magnetic switch.

4. The starter assembly of claim 3, wherein the control unit further comprises a microprocessor electrically connected to the electromagnet.

5. The starter assembly of claim 4, wherein the control unit actuates the switch according to a programmed first preheat time.

6. The starter assembly of claim 4, wherein the control unit is programmable to receive a second preheat time.

7. The starter assembly of claim 6, wherein the control unit is operable to actuate the switch according to the second preheat time.

8. A starter assembly for a gas discharge lamp, the starter assembly comprising:
   a magnetic switch located in the gas discharge lamp;
   an electronics module operable to actuate the magnetic switch, the electronics module further comprising:
     an electromagnet;
     a control unit operable to control the operation of the electromagnet;
     wherein the control unit comprises a programmable microprocessor, said microprocessor being programmed with a first preheat time; and
   wherein the electronics module actuates the magnetic switch for a pre-determined length of time.

9. The starter assembly of claim 8, wherein the magnetic switch is connected in series between at least two electrodes of the gas discharge lamp.

10. The starter assembly of claim 8 wherein the control unit causes the electromagnet to actuate the switch for the first preheat time.

11. The starter assembly of claim 8 wherein the programmable microprocessor is further programmed with a second preheat time.

12. The starter assembly of claim 11 wherein the control unit causes the electromagnet to actuate the switch for the second preheat time.

* * * * *